US008681167B2

(12) United States Patent
Zhang et al.

(10) Patent No.: US 8,681,167 B2
(45) Date of Patent: Mar. 25, 2014

(54) PROCESSING PIXEL PLANES REPRESENTING VISUAL INFORMATION

(75) Inventors: Wujian Zhang, Santa Clara, CA (US); Alok Mathur, Milpitas, CA (US); Sreenath Kurupati, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 1066 days.

(21) Appl. No.: 12/236,320

(22) Filed: Sep. 23, 2008

(65) Prior Publication Data

US 2010/0073386 A1 Mar. 25, 2010

(51) Int. Cl.
G09G 5/36 (2006.01)
G06F 15/00 (2006.01)
G06T 15/40 (2011.01)

(52) U.S. Cl.
USPC ........... 345/550; 345/422; 345/501; 345/502; 345/549

(58) Field of Classification Search
None
See application file for complete search history.

(56) References Cited

U.S. PATENT DOCUMENTS 5,768,569 A * 6/1998 Hoddie et al. ............... 345/501
6,344,640 B1 * 2/2002 Rhoads ....................... 250/201.9
6,624,816 B1 9/2003 Jones, Jr.
7,894,711 B2 * 2/2011 McCrossan et al. ......... 386/336
2005/0270297 A1 * 12/2005 Munday et al. .............. 345/502
2006/0244758 A1 11/2006 Ruge

OTHER PUBLICATIONS

First Office Action for Chinese Patent Application No. 200910221477.1, Mailed Jul. 6, 2011, 9 pages.
David Njibamum, European Search Report, Jan. 29, 2010, 3 pages, Application No. 09252255.6, European Patent Office, Munich, Germany.
David Njibamum, Communication pursuant to Article 94(3) EPC, Mar. 10, 2010, 6 pages, Application No. 09252255.6, European Patent Office, Munich, Germany.
Nvidia Corporation, Nvidia GeForce 8800 Architecture Technical Brief, Nov. 8, 2006, 56 pages.
Office Action Received for European Patent Application No. 09252255.6, mailed on May 29, 2012, 8 pages.
Office Action Received for Chinese Patent Application No. 200910221477.1, mailed on May 3, 2012, 5 pages of Office Action and 5 pages of English translation.
Office Action received for Chinese Patent Application No. 200910221477.1, mailed on Feb. 5, 2013, 5 pages of Office Action and 7 pages of English Translation.

* cited by examiner

*Primary Examiner* — Tize Ma
(74) *Attorney, Agent, or Firm* — Ryder, Lu, Mazzeo and Konieczny, LLC; Douglas J. Ryder

(57) ABSTRACT

A computer system may comprise a graphics controller, which may support a display handler. In one embodiment, the display handler may receive configuration values comprising a quantity value and a blending order. In one embodiment, the display handler may determine the number of universal pixel planes using the quantity value. The display handler may provide a number of universal pixel planes equal to the quantity value and the universal pixel planes may be provided using a reference universal pixel plane. The display handler may render each of the universal pixel planes into a type of pixel plane indicated by the corresponding elements of the blending order.

20 Claims, 4 Drawing Sheets

PROCESSING PIXEL PLANES REPRESENTING VISUAL INFORMATION

BACKGROUND

A computer system may be coupled to a display device that may allow a computer system to display visual information such as video and graphics. The computer system may process visual information before displaying the visual information on the display device. The computer system may comprise a video display controller, which may retrieve data representing various formats of visual information. Processing of data may include tasks such as conversion of data from one format to other, color space conversion, color correction, gamma correction, and encoding to suit the display format. Typically, a number of pixel planes and an order in which these pixel planes are arranged for blending are fixed for a given architecture. Having a fixed order and fixed number of pixel planes may not provide flexibility to change the order in which the pixel planes may be arranged and to change the number of a type of pixel planes used.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes processing pixel planes representing visual information. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
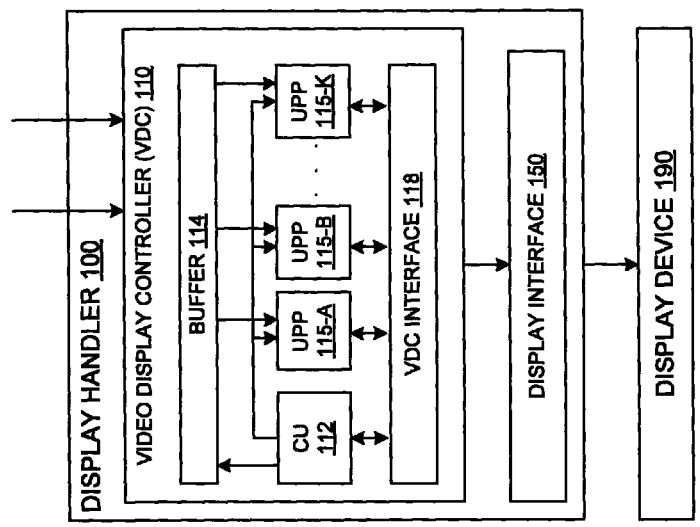
FIG. 1 illustrates a display handler 100 in accordance with one embodiment.

An embodiment of a display handler 100 is illustrated in FIG. 1. The display handler 100 may comprise a video display controller 110 and a display interface 150. The display handler 100 may be provisioned between a host system and a display device 190. In one embodiment, the display handler 100 may support High Definition Multi-media Interface (HDMI), analog component video, Phase Alternating Line (PAL) or National Television System Committee (NTSC), or Sequential Color with Memory (SECAM) standards and such other similar standard outputs to support the display device 190. In one embodiment, the display device 190 may comprise a PAL/NTSC enabled television, a cathode ray tube (CRT) screen, an liquid crystal display (LCD) device, and such other similar devices. In one embodiment, the graphics and/or video processing techniques described herein with reference to the display handler 100 may be implemented in various hardware architectures.

For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device such as mobile internet devices, cell phones, home entertainment devices and such other devices.

In one embodiment, the video display controller (VDC) 110 may comprise a control unit (CU) 112, a plurality of programmable arrays, which may be provided as universal pixel planes (UPP) 115-A to 115-K, and a VDC interface 118. In one embodiment, a user may generate a standardized hardware module that may be referred to as a reference universal pixel plane (UPP). In one embodiment, a user may generate the reference UPP using a hardware description language such as resistor-transistor logic (RTL) code. In one embodiment, the user may provide combinations comprising configuration values, which may be used to generate one or more UPPs 115 by providing the reference UPP. In other embodiment, the host may generate combinations comprising the configuration values using the settings defined from an architecture stand point.

In one embodiment, the video display controller (VDC) interface 118 may couple the VDC 110 to a memory controller using a direct interface such as SAP-ms. In one embodiment, the VDC 118 may receive commands from the control unit 112 and may support transfer of pixel data over the direct interface. In one embodiment, the direct interface may support 64 bit data transfers to transfer pixel data from the memory to the VDC 110. In one embodiment, the video display controller (VDC) interface 118 may couple the VDC 110 to a host using a host interface such as SAP-ms. In one embodiment, the VDC interface 118 may receive control data from a host and transfer the control data to the control unit 112 using the host interface. In one embodiment, the host interface may support 32 bit data transfers to transfer control data comprising configuration values, for example, from the host to the VDC 110.

In one embodiment, the control unit (CU) 112 may retrieve pixel data stored in a memory (picture buffers) through the video display controller (VDC) interface 118. In one embodiment, control unit 112 may comprise data requesters each corresponding to a UPP 115. In one embodiment, the data requesters may send a request for pixel data and a logic unit of the control unit 112 may arbitrate the requests before retrieving pixel data from the memory. In one embodiment, the control unit 112 may store the pixel data in designated regions of a buffer 114. In one embodiment, the buffer 114 may be divided into regions and each region may be associated with a UPP 115.

In one embodiment, the control unit 112 may retrieve video from the memory and store the video pixel data to a region of the buffer 114 associated with, for example, the UPP 115-A, which may be configured to operate as a video pixel plane. In one embodiment, the control unit 112 may retrieve graphics pixel data from the memory and store the graphics pixel data to a region of the buffer 114 associated with the UPP 115-B, for example, which may be configured to operate as a graphics pixel plane.

In one embodiment, the CU 112 may receive configuration values from a user of a host system and may instantiate the UPPs 115 using the configuration values. In one embodiment, the configuration values may be provided as combinations and each combination may comprise data representing the number of UPPs and the order in which the UPPs may be arranged. In one embodiment, the CU 112 may program the registers of a UPP 115 to render the UPP 115 as, for example, a video plane or a graphics plane. In one embodiment, programming the registers of a UPP to render the UPP as a video plane or a graphics plane may provide flexibility to change the number of pixel planes and/or the order in which the pixel planes are arranged for blending.

In one embodiment, the control unit 112 may use the configuration values of a first combination to program the registers of the UPP 115-A to 115-E to render UPPs 115-A and 115-C to 115-E as video pixel planes and UPP 115-B as a graphics pixel plane, for example. In other embodiment, the control unit 112 may use the configuration values of a second combination to program the registers of the UPP 115-A to 115-E to render UPP 115-A, 115-B, and 115-D as graphics pixel planes and UPP 115-C and 115-E as video pixel planes, for example. In one embodiment, the number of pixel planes may be less than or more than five pixel planes and the blending order may comprise any combination of the pixel planes as specified by an architecture.

Figure 2:
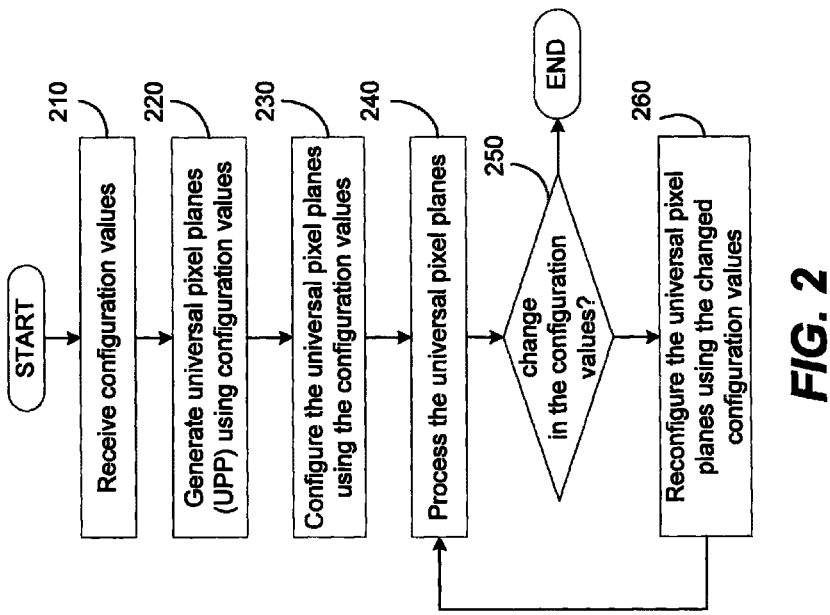
FIG. 2 illustrates the display handler 100, which provides flexibility to change the number and order of universal pixel planes (UPP) in accordance with one embodiment.

An embodiment of a display handler 100, which provides flexibility to change the number and order of universal pixel planes (UPP) is illustrated in FIG. 2.

In block 210, the display handler 100 may receive configuration values over a host interface. In one embodiment, the configuration values may represent a combination in which pixel planes such as video planes and graphics planes may be arranged in an order. For example, a first combination may comprise Type-1 quantity=4, Type-2 quantity=1 and blending order=T1-T2-T1-T1-T1. In one embodiment, the Type-1 may represent a video pixel plane and Type-2 may represent a graphics pixel plane and the blending order represents that a first plane equals video plane, a second plane equals a graphics plane, and a third, fourth, and fifth planes equal video plane.

In block 220, the display handler 100 may generate one or more universal pixel planes (UPP). In one embodiment, the control unit 112 may receive configuration values representing one or more combinations and provide UPPs 115 using the configuration values. In one embodiment, the number of UPPs (=5) provided by the control unit 112 may equal a sum of Type-1 quantity (=4, for example) and Type-2 quantity (=1, for example). In one embodiment, the control unit 112 may generate five implementations UPP 115-A, UPP 115-B, UPP 115-C, UPP 115-D and UPP 115-E using the reference UPP. In one embodiment, the configuration values of a combination may comprise more than two types of UPPs as well.

In block 230, the display handler 100 may configure the universal pixel planes (UPP) using the configuration values. In one embodiment, the control unit 112 may program the registers of the UPP and such programming may render a UPP as one of the Type specified by the configuration values. In one embodiment, using the contents of the blending order field (=T1-T2-T1-T1-T1) of the first combination, the control unit 112 may program the registers of UPP 115-A and UPP 115-C to 115-D as Type-1 and UPP 115-B as Type-2. In one embodiment, the Type-1 may refer to video plane and Type-2 may refer to graphics plane.

In one embodiment, the control unit 112 may program the configuration values (Video format: Pseudo-planar YCbCr 4:2:2 8-bit; Conversion: 4:2:2 to 4:4:4 is enabled; Scaling: disabled; Color space conversion: YCbCr to RGB is enabled and correspondingly the conversion equation coefficients are programmed; Gamma correction: Enabled, correspondingly the conversion table is programmed) in the registers of the UPP 115-A, 115-C and 115-D to render the UPPs UPP 115-A, 115-C and 115-D as video pixel planes.

In one embodiment, the control unit 112 may program the configuration values (Video format: 32-bit ARGB (8-8-8-8); Conversion: 4:2:2 to 4:4:4 is disabled; Scaling: Enabled; Color space conversion: Disabled; Gamma correction: Disabled) in the registers of the UPP 115-B and 115-E to render the UPPs 115-B and 115-E as graphics pixel planes.

In block 240, the display handler 100 may process the UPPs. In one embodiment, the display handler 100 may use a blender to perform blending operation on the UPPs 115-A to 115-D.

In block 250, the display handler 100 may check whether the configuration values have changed and control passes to block 260 if the configuration values (or a next combination) change and the process ends otherwise.

In block 260, the display handler 100 may reconfigure the universal pixel planes (UPP) using the changed configuration values. In one embodiment, the changed configuration values may equal (T2-T2-T1). However, the number of UPPs may be less than or greater than 3 as well. In one embodiment, the control unit 112 may reprogram the registers to render UPP 115-A and UPP 115-B as Type-2 and UPP 115-C as Type-1. In one embodiment, the display handler 100 may change the number and order in which the UPPs may be arranged using the configuration values. Such an approach may provide flexibility in processing the pixel planes.

Figure 3:
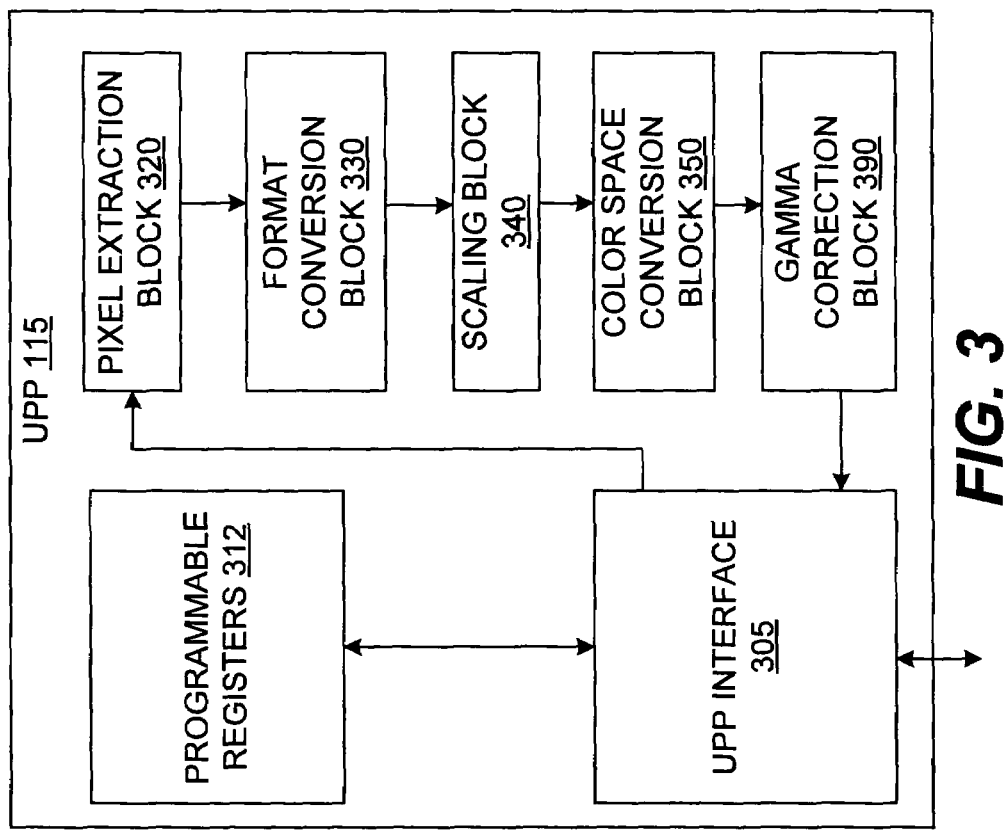
FIG. 3 illustrates a block diagram of a universal pixel plane in accordance with one embodiment.

An embodiment of a universal pixel plane (UPP) 115 is illustrated in FIG. 3. In one embodiment, the UPP 115 may comprise a UPP interface 305, programmable registers 312, a pixel extraction block 320, a format conversion block 330, a scaling block 340, a color space conversion block 350, and a gamma correction block 390. In one embodiment, five stages 320, 330, 340, 350, and 390 may be scheduled for each the UPP 115. However, some or all the five stages may be enabled based on the Type of the pixel plane.

In one embodiment, the UPP interface 305 may receive the programmable values and store the programmable values in the programmable registers 312. In one embodiment, the programmable values stored in the registers 312 may render a UPP 115 as one of the Type indicated by the configuration values. In one embodiment, the UPP interface 305 may transfer pixel data from a region of the buffer 314 associated with the UPP 115 to a pixel extraction block 320. In one embodiment, the UPP interface 305 may transfer the programmable values and pixel data to the UPP 115 as directed by the control unit 112.

In one embodiment, the pixel formats supported by the UPP 115 may include 8/10-bit component packed pseudo-planar YCbCr 422 format for video planes, and 32-bit ARGB (8-8-8-8); 32-bit XRGB (X-8-8-8); 16-bit ARGB (1-5-5-5 and 4-4-4-4), 16-bit RGB (5-6-5 and X-5-5-5) packed formats for graphics planes.

In one embodiment, the pixel extraction block 320 may extract pixels from packed bit stream retrieved from the memory and split components of the pixels.

In one embodiment, the pixel extraction block 320 may receive pixel data from the region of the buffer 114 and extract the pixel data to enable pixel-by-pixel processing. In one embodiment, due to the packed nature of the stored data, the individual pixels may start at fractional byte locations. In one embodiment, there may be separate frame start addresses for Y and Cb Cr in YCbCr modes. For pixel formats that use 8 bits/component, the pixels start at the boundary of the byte. In one embodiment, the pixel extraction block 320 may extract pixels from different positions within the frame.

In one embodiment, the pixel extraction block 320 may also split the components of the pixels. In one embodiment, if the pixel data is in YCbCr format, the pixel extraction block 320 may split the 'Y' component and 'CbCr' components. In one embodiment, if the pixel data is in ARGB format, the pixel extraction block 320 may split alpha (A) component from the RGB components.

In one embodiment, the format conversion block 330 may receive the pixels from the pixel extraction block 320 and convert the pixels from one format to the other. In one embodiment, the format conversion block 330 may convert the YCbCr in 4:2:2 (422 format) to YCbCr in 4:4:4 (444 format), wherein Y is the luminance and CbCr are the chroma components. In one embodiment, the format conversion block 330 may interpolate the YCbCr in 422 format to generate YCbCr in 444 format. In one embodiment, the format conversion block 330 may comprise a 4-tap horizontal scaling to interpolate the missing U V samples in the YCbCr in 422 format. In one embodiment, the 422 to 444 conversion may comprise 1:2 upscale operations for each chroma (U and V) component.

In one embodiment, the scaling block 340 may provide up-scaling through pixel/line duplication. In one embodiment, the control unit 112 may program a control register with a scaling factor. In one embodiment, the scaling block 340 may provide Cb and Cr components of the YCbCr format with an up-scaling factor of 2, while Y component may remain unchanged. In one embodiment, if the scaling block 340 receives alpha and RGB components, the scaling block 340 may replicate the alpha component and interpolate the RGB components.

In one embodiment, the color space conversion block 350 may perform RGB to YCbCr conversion or YCbCr to RGB conversion. In one embodiment, the color space conversion block 350 may be programmed to perform color space conversion. In one embodiment, the color space conversion block 350 may be provided with one or more inputs such as R/Cr, Y/G, and B/Cb along with one or more programmable parameters such as signed input offset values, signed co-efficient matrix values, and signed output offset range values. In one embodiment, in addition to color space conversion, the color space conversion block 350 may also perform brightness and hue/contrast adjustment.

In one embodiment, the gamma correction block 390 may perform gamma correction to compensate for non-linear characteristics of the display device 190 such as the cathode ray tube (CRT) of a television or a CRT based computer monitor. In one embodiment, gamma correction is a pre-correction of the signal received from the color space conversion block 350. In one embodiment, gamma is a parameter of light reproduction function of a CRT. In one embodiment, the non-linear characteristic of a CRT may be represented by a transfer function of an approximately exponential curve referred to as a 'gamma curve'. In one embodiment, the gamma correction may be approximated in hardware by implementing a piece-wise linear approximation of the gamma curve. In one embodiment, the output of the gamma correction unit 390 may be provided as input to a blending unit, which blends the output from Type-1 and Type-2 UPPs.

Figure 4:
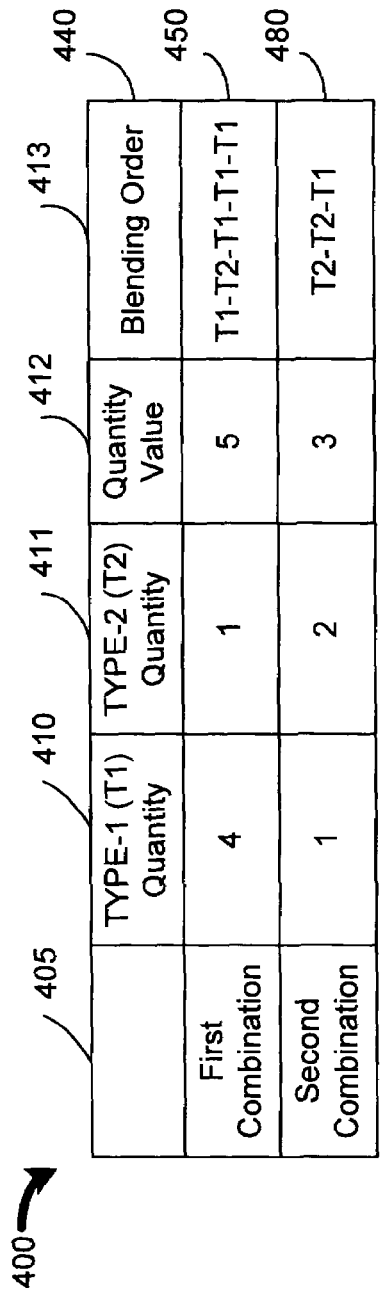
FIG. 4 depicts a table 400 comprising a first combination and a second combination according to which the universal pixel planes (UPP) is to be configured in accordance with one embodiment.

An embodiment of the configuration values represented as one or more combinations is depicted in a table 400 of FIG. 4. In one embodiment, the table 400 comprises four columns 405, 410, 411, 412, and 413 and three rows 440, 450, and 480. Column 405 represents a combination identifier (Cid), column 410 represents quantity of type-1 UPP, Type-1 (T1) quantity, column 411 represents quantity of type-2 UPP, Type-2 (T2) quantity, column 412 represents a 'quantity value', and column 413 represents the blending order.

Row 450 comprises 'first combination', '4', '1', '5' and 'T1-T2-T1-T1-T1' representing combination identifier (Cid), T1, T2, and the blending order respectively. In one embodiment, the control unit 112 may use the configuration values such as the quantity value (=5) to provide five UPPs 115-A to 115-E and then program the UPP 115-A and 115-C to 115-E as Type-1 universal pixel planes and UPP 115-B as Type-2 universal pixel plane.

Row 480 comprises 'second combination', '1', '2', '3' and 'T2-T2-T1' representing combination identifier (Cid), T1, T2, 'quantity value' and the blending order respectively. In one embodiment, the control unit 112 may use the configuration values such as the quantity value (=3) of the second combination to provide three UPPs 115-A to 115-C and then program the UPP 115-A and 115-B as Type-2 universal pixel planes and UPP 115-C as Type-1 universal pixel plane.

Figure 5:
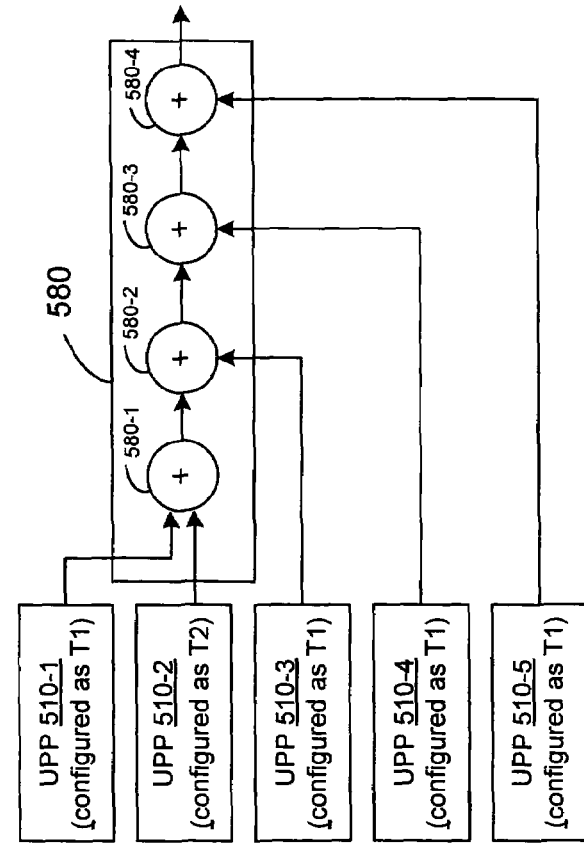
FIG. 5 illustrates UPPs configured and arranged in accordance with the first combination.

An embodiment of an arrangement of UPPs in accordance with the first combination is depicted in FIG. 5. In accordance with the blending order, the UPP 510-1, UPP 510-3 to UPP 510-5 may be rendered as Type-1 UPP and UPP 510-2 may be rendered as Type-2 UPP. In one embodiment, the UPPs 510-1 to 510-5 may be arranged to satisfy the blending order of the first combination.

In one embodiment, the output of UPPs 510-1 and 510-2 may be provided as inputs to a blending element 580-1. In one embodiment, the output of the blending element 580-1 and the UPP 510-3 may be provided as inputs to a blending element 580-2. In one embodiment, the output of the blending element 580-2 and the UPP 510-4 may be coupled to a blending element 580-3. In one embodiment, the output of the blending element 580-3 and the UPP 510-5 may be provided as inputs to the blending element 580-4. In one embodiment, the output of the blending element 580-4 may be referred to as the output of the blender 580. In one embodiment, the blending elements 580-1 to 580-4 may collectively position the content into a window on the screen coordinates of the display device 190. Also, the blending elements 580-1 to 580-4 may collectively merge the contents from different UPP 510-1 to 510-5 based on the blending order.

Figure 6:
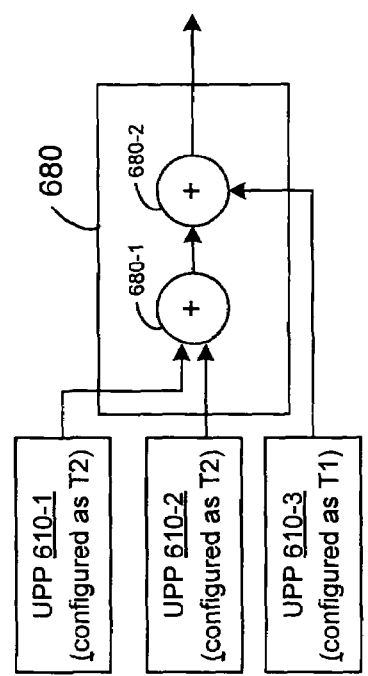
FIG. 6 illustrates UPPs configured and arranged in accordance with the second combination.

An embodiment of an arrangement of UPPs in accordance with the second combination is depicted in FIG. 6. In accordance with the blending order, the UPP 610-3 may be rendered as Type-1 UPP and the UPP 610-1 and UPP 610-2 may be rendered as Type-2 UPP. In one embodiment, the UPPs 610-1 to 610-3 may be arranged to satisfy the blending order of the second combination.

In one embodiment, the output of UPPs 610-1 and 610-2 may be provided as inputs to a blending element 680-1. In one embodiment, the output of the blending element 680-1 and the UPP 610-3 may be provided as inputs to a blending element 680-2. In one embodiment, the output of the blending element 680-2 may be referred to as the output of the blender 680. In one embodiment, the blending elements 680-1 to 680-2 may collectively position the content into a window on the screen coordinates of the display device 190. Also, the blending elements 680-1 to 680-2 may collectively merge the contents from different UPP 610-1 to 610-3 based on the blending order.

Figure 7:
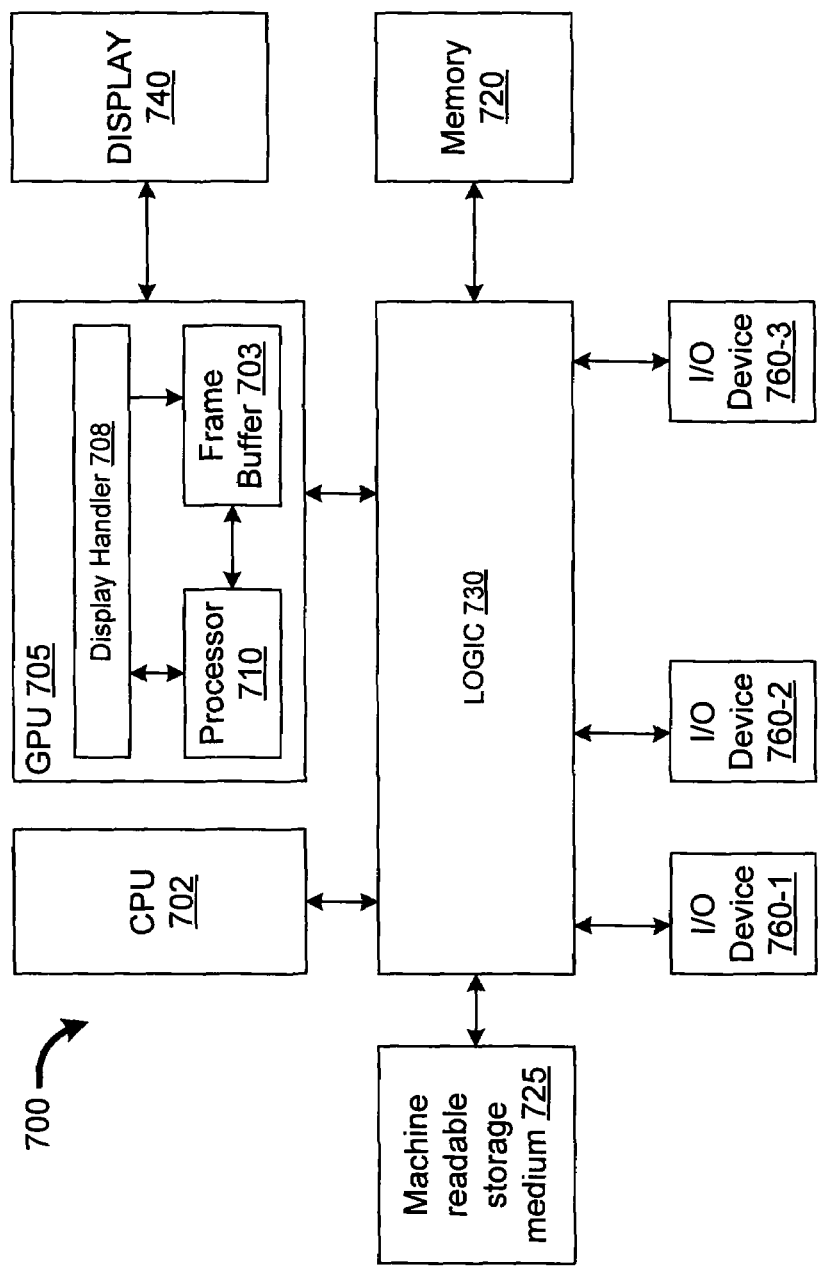
FIG. 7 illustrates a computer system comprising the display handler in accordance with one embodiment.

Referring to FIG. 7, a computer system 700 may include a graphics processor unit (GPU) 705, including a single instruction multiple data (SIMD) processor 710. The processor 710, in one embodiment, may store a sequence of instructions, to provide and process the universal pixel planes in machine readable storage medium 725. However, the sequence of instructions may also be stored in the memory 720 or in any other suitable storage medium.

While a separate graphics processor unit 705 is depicted in FIG. 7, in some embodiments, a central processing unit 702 for the entire computer system 700 may be used to implement combinations of UPP 115 and processing of such combinations of UPPs 115, as another example. The central processing unit 702 that operates the computer system 700 may be one or more processor cores coupled to logic 730. The logic 730, for example, could be chipset logic in one embodiment. The logic 730 is coupled to the memory 720, which can be any kind of storage, including optical, magnetic, or semiconductor storage. The graphics processor unit 702 is coupled through a frame buffer 703 to a display 740.

In one embodiment, the GPU 705 may comprise a display handler 708. In one embodiment, the GPU 705 may process the transactions and transfer the corresponding data between the memory 720, the I/O devices 760, and the display 740. In one embodiment, the display handler 708 may receive configuration values from the processor 710 or the CPU 702 or from a user and provide UPPs using the configuration values. In one embodiment, the display handler 708 may render the UPPs as one of the type (for example, a video or a graphics plane) using the configuration values. In one embodiment, a user may use one of the I/O devices 760 to provide the configuration values. In other embodiment, the processor 710 or the graphics processor unit 705 may be programmed to generate the configuration values.

In one embodiment, the display handler 708 may retrieve pixel data from the machine readable storage medium 725 or the memory 720 and provide the pixel data to the universal pixel planes. In one embodiment, providing the UPPs and rendering the UPPs based on the configuration values to match the arrangement provided by the configuration values may provide flexibility to change the number of UPPs and the order in which the UPPs may be blended.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

What is claimed is:

1. A non-transitory processor readable storage medium storing content that when executed by the processor causes the processor to:
    receive configuration information, wherein the configuration information defines a first quantity of different types of pixel planes to be rendered and a first blending order to define order with which different type of pixel planes rendered are to be blended for display;
    configure at least a first subset of universal pixel planes, from a plurality of universal pixel planes available, to render the first quantity of the different type of pixel planes defined in the configuration information, wherein a universal pixel plane can be configured as one of a plurality of different types of pixel planes, wherein each of the first subset of universal pixel planes is configured as an appropriate type of pixel plane based on the first blending order defined in configuration information; and
    render the appropriate type of pixel plane for each of the first subset of universal pixel planes by retrieving pixels from an associated memory and performing appropriate operations thereon.

2. The non-transitory processor readable storage medium of claim 1, wherein the different type of pixel planes include video pixel planes.

3. The non-transitory processor readable storage medium of claim 1, wherein the different type of pixel planes include graphics pixel planes.

4. The non-transitory processor readable storage medium of claim 1, wherein the configuration information is received from a user.

5. The non-transitory processor readable storage medium of claim 1, wherein the configuration information is received from a host system.

6. The non-transitory processor readable storage medium of claim 1, wherein when executed by the processor the content further causes the processor to
    receive new configuration information defining a second quantity of different types of pixel planes and a second blending order;
    configure at least a second subset of universal pixel planes, from the plurality of universal pixel planes available, to render the second quantity of the different type of pixel planes defined in the new configuration information, wherein each of the second subset of universal pixel planes is configured as an appropriate type of pixel plane based on the second blending order defined in the new configuration information; and render the appropriate type of pixel plane for each of the second subset of universal pixel planes by retrieving pixels from the associated memory and performing appropriate operations thereon.

7. The non-transitory processor readable storage medium of claim 1, wherein the plurality of universal pixel planes include programmable registers, and when executed by the processor the content further causes the processor to program the programmable registers for each of the first subset of universal pixel planes based on the configuration information.

8. An apparatus comprising:
a controller; and
a controller readable storage medium storing content that when executed by the controller causes the controller to:
receive configuration information, wherein the configuration information defines a first quantity of different types of pixel planes to be rendered and a first blending order defining order with which different type of pixel planes rendered are to be blended for display;
configure at least a first subset of universal pixel planes, from a plurality of universal pixel planes available, to render the first quantity of the different type of pixel planes based on the configuration information, wherein a universal pixel plane can be configured as one of a plurality of different types of pixel planes, wherein each of the first subset of universal pixel planes is configured as an appropriate type of pixel plane based on the first blending order defined in configuration information; and
render the appropriate type of pixel plane for each of the first subset of universal pixel planes by retrieving pixels from an associated memory and performing appropriate operations thereon.

9. The apparatus of claim 8, wherein the different type of pixel planes include video pixel planes.

10. The apparatus of claim 8, wherein the different type of pixel planes include graphics pixel planes.

11. The apparatus of claim 8, wherein the configuration information is received from a user.

12. The apparatus of claim 8, wherein the configuration information is received from a host system.

13. The apparatus of claim 8, wherein when executed by the controller the content further causes the controller to
receive new configuration information defining a second quantity of different types of pixel planes and a second blending order;
configure at least a second subset of universal pixel planes, from the plurality of universal pixel planes available, to render the second quantity of the different type of pixel planes defined in the new configuration information, wherein each of the second subset of universal pixel planes is configured as an appropriate type of pixel plane based on the second blending order defined in the new configuration information; and
render the appropriate type of pixel plane for each of the second subset of universal pixel planes by retrieving pixels from the associated memory and performing appropriate operations thereon.

14. The apparatus of claim 8, wherein the plurality of universal pixel planes include programmable registers and when executed by the controller the content further causes the controller to program the programmable registers for each of the first subset of universal pixel planes based on the configuration information.

15. An apparatus comprising:
an interface to receive configuration information, wherein the configuration information defines a first quantity of different types of pixel planes to be rendered and a first blending order defining order with which different type of pixel planes rendered are to be blended for display;
a control unit; and
a plurality of universal pixel planes, wherein a universal pixel plane includes programmable arrays that enable it to be configured as one of a plurality of different types of pixel planes, wherein the control unit is to
receive the configuration information from the interface;
configure at least a first subset of the plurality of universal pixel planes to render the first quantity of the different type of pixel planes defined in the configuration information, wherein each of the first subset plurality of universal pixel planes is configured as an appropriate type of pixel plane based on the first blending order defined in configuration information; and
render the appropriate type of pixel plane for each of the first subset plurality of universal pixel planes by retrieving pixels from an associated memory and performing appropriate operations thereon.

16. The apparatus of claim 15, wherein the different type of pixel planes include video pixel planes.

17. The apparatus of claim 15, wherein the different type of pixel planes include graphics pixel planes.

18. The apparatus of claim 15, wherein the configuration information is received from a user.

19. The apparatus of claim 15, wherein the configuration information is received from a host system.

20. The apparatus of claim 15, wherein the controller is further to
receive new configuration information defining a second quantity of different types of pixel planes and a second blending order;
configure at least a second subset of universal pixel planes, from the plurality of universal pixel planes available, to render the second quantity of the different type of pixel planes defined in the new configuration information, wherein each of the second subset of universal pixel planes is configured as an appropriate type of pixel plane based on the second blending order defined in the new configuration information; and
render the appropriate type of pixel plane for each of the second subset of universal pixel planes by retrieving pixels from the associated memory and performing appropriate operations thereon.

* * * * *

UNITED STATES PATENT AND TRADEMARK OFFICE
CERTIFICATE OF CORRECTION

PATENT NO. : 8,681,167 B2
APPLICATION NO. : 12/236320
DATED : March 25, 2014
INVENTOR(S) : Zhang et al.

Page 1 of 1

It is certified that error appears in the above-identified patent and that said Letters Patent is hereby corrected as shown below:

In the Claims

Column 10, line 27, Claim 15, after "subset" delete "plurality".

Column 10, line 33, Claim 15, after "subset" delete "plurality".

Signed and Sealed this
Twenty-second Day of July, 2014

Michelle K. Lee
*Deputy Director of the United States Patent and Trademark Office*